United States Patent Office 3,568,273
Patented Mar. 9, 1971

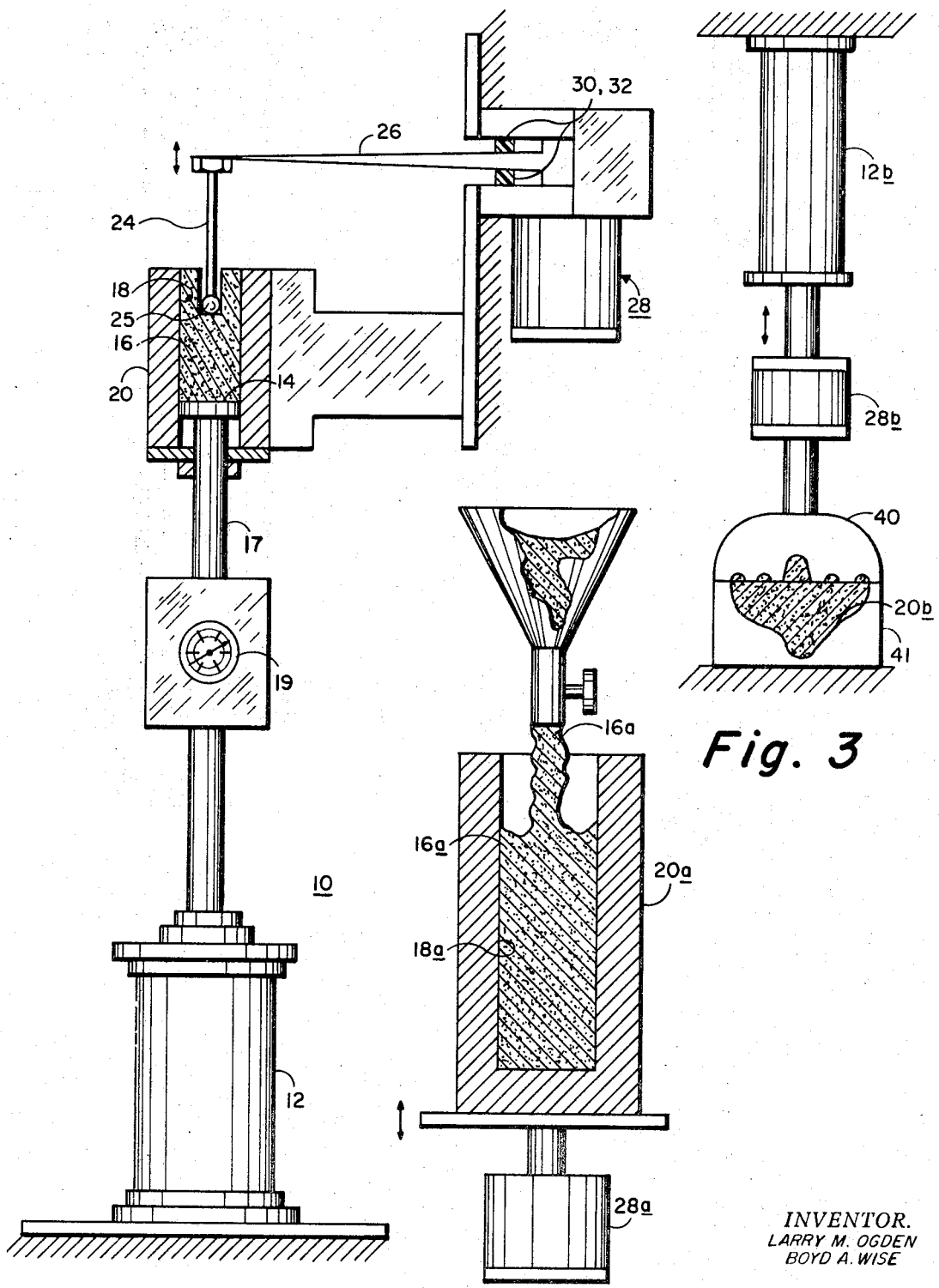

3,568,273
PREPARATION OF CERAMIC BODIES
AND THE LIKE
Larry M. Ogden and Boyd A. Wise, Penfield, N.Y.,
assignors to General Dynamics Corporation
Filed Nov. 3, 1967, Ser. No. 680,430
Int. Cl. B28b 1/10, 7/18, 21/14
U.S. Cl. 25—3     5 Claims

ABSTRACT OF THE DISCLOSURE

Method and apparatus for preparing ceramic bodies which method comprises fluidizing a charge of a wet clay body or the like either while it is being formed or in a post-forming operation. The fluidization provides a more homogeneous and isotropic body. Thereafter, the body is fired to form a finished ceramic part or object.

---

The present invention relates to the formation of ceramic bodies.

Ceramic bodies may be prepared for forming in various ways. The present invention is primarily concerned with wet methods of preparation but is also applicable to methods ordinarily classified as body preparation for dry pressing.

One common method of preparing ceramic bodies for forming consists of wetting and dispersing clays or other materials composing the body, screening these materials to remove coarse oversize particles removing excess water from the charge in a filter press, and then placing the charge in a pug mill where air is removed. Finally, the charge is extruded in a cohesive moldable mass which has sufficient wet or green strength to be formed and fired.

One of the disadvantages of this method is that after extrusion, ceramic bodies often have a laminar grain or flow structure, or have a non-uniform size and distribution of void spaces, or have a non-uniform distribution of particle size, or have a non-uniform composition, with respect to the various constituents composing the body. Each of these inhomogeneities or anisotropies can be caused by or made more pronounced during the extrusion process or a subsequent forming process by virtue of the effect of flow forces applied to cause the extrusion or subsequent forming.

The adverse consequences of a non-uniform or anisotropic structure are several and of great importance. They include:

(1) Non-uniform stresses in the formed part that cause either an immediate deformation upon release of the forming means or a residual stress that may cause or contribute to cracking.

(2) Non-uniform drying of the parts tending to give rise to differential shrinking and cracking of the green bodies.

(3) A greater amount of water is required for wet mixes, leading to correspondingly greater shrinkage, differential motion and cracking.

(4) Upon firing, non-uniform composition leads to differential primary recrystallization due to uneven nucleii distribution and material composition, with subsequent differential grain growth.

(5) Upon firing, non-uniform distribution of pores or void spaces give rise to regions of low-shrinkage, low density and low strength, since there are typically lower densification forces in regions of larger pores. Such regions of low shrinkage impose added stresses on the parts and tend to increase shrink cracks.

It has been found in accordance with the invention that if the charge is vibrated to fluidize its constituents, during the extrusion or other forming process, that far lower flow forces need to be applied to cause the extrusion or forming to take place and that the lower forming forces produce far fewer or less pronounced inhomogeneities or anisotropies. In the case of flow around an obstacle or into a change of sectional area, there is a shear flow component that will tend to align particles having shape anisotropy such as platelets. Lower flow forces tend to result in less particle alignment. Other beneficial modifications occur such as lower, more uniform stresses in the formed part with less deformation upon release of the forming means, more complete filling, better particle dispersion, fewer voids, smaller voids, and more uniformly distributed voids.

If the charge is vibrated to fluidize its constituents after forming, essentially the same benefits may be obtained except that they are attributable to a post-forming homogenization and stress relief. This involves small values of flow, i.e., particle motion, with high particle mobility and is therefore, basically a final forming operation that differs in degree but not in kind from the operation that involves fluidizing during the gross forming of the body.

In one exemplary process in accordance with the invention, a mandrel penetrates the charge body to form a hole or cavity and during the act of penetration is excited in the sonic frequency range. The vibratory mandrel causes the charge to fluidize, decreasing its viscosity and reducing particle orientation. By vibrating the mandrel in the sonic frequency range, the penetration force is greatly reduced.

Features and advantages of the present invention are:
 (a) Greater yield of green parts for firing.
 (b) Greater yield of fired parts.
 (c) Processing economies related to use of drier bodies for forming.
 (d) Greater physical or dielectric strength in the fired body.
 (e) Other benefits accruing to a more uniform, higher density body with lower residual stresses.

The invention itself, both as to its organization and method of operation, as well as additional objects and features and advantages thereof will become more readily apparent from a reading of the following description taken in connection with the accompanying drawing in which:

FIG. 1 is a diagrammatic illustration of an apparatus for forming clay billets in accordance with the present invention; and FIGS. 2 and 3 show alternate versions of apparatus for forming billets in accordance with the invention.

Turning first to FIG. 1, a representative apparatus 10 comprises a hydraulic cylinder 12, an extrusion piston 14 and mechanical connection 17 between the cylinder 12 and the piston 14 which includes a spring scale 19 permitting the operator to monitor the force magnitude needed to extrude the constituents comprising a charge 16 into a body such as a billet. The charge 16 or body constituents is placed within the confines of a cavity 18 provided by a mold 20. Moreover, the cavity 18 is cylindrically shaped and open at the top and bottom of the mold with the extrusion piston 14 being inserted through the bottom opening.

A conically excited reciprocatory mandrel 24 is axially aligned with the cavity 18 and terminates in a ball shaped free end portion 25 which during billet formation is disposed within the cavity 18 at a position adjacent its top end. The mandrel 12 is fixed to a cantilevered blade 26 which in turn is driven by a vibrating generator. The term mandrel will be understood to include an extrusion die having a center pin or other means for piercing the charge during extrusion. In the event that the mold has grooved walls, as shown in FIG. 3, to form flanges in the body 16, the piston 14 can raise or lower the mold or mold parts as in FIG. 3, so that the mandrel pierces the body during extrusion (such movable molds being shown for example in Hoffman, 1,526,788). The blade is supported by flexible bearings 30 and 32. The vibration generator 28 in a preferred embodiment of the invention is a hydroacoustic vibration generator of the type described in U.S. Letters Patent No. 3,004,512.

Hydroacoustic vibration generators derive high acoustic energy by modulating an otherwise uniform flow of a fluid medium, and in so doing, originate pressure variations thus arising from the alternate fluid accelerations and decelerations accompanying the modulatory process. A radiating element (not shown) couples the pressure variations to the blade member 26.

Although a hydroacoustic oscillator is preferred, it will be understood that other vibrating apparatus could also be used in the practice of this invention.

With sufficient sonic energy applied via the mandrel 24, the charge 16 will fluidize during extrusion, decreasing viscosity and reducing particle orientation in the billet or the extruded product.

In operation, the clay mix and other powdered constituents of a green ceramic body, after having been wet and dispersed, are introduced into the mold 20. Then the vibratory mandrel 24 is inserted a short distance down into the top end of the cavity 18 and excited. Now the hydraulic cylinder 12 slowly drives the extrusion piston 14 upwardly until the billet is free from the mold 20. Thus the formed billet is pipe-shaped and thereafter is fired to complete the operation.

The rate at which the mandrel 24 should be vibrated may be determined experimentally by observing the frequency needed to fluidize the charge 16. It has been found that extrusion forces are significantly reduced when the mandrel is vibrated in essentially axial direction (i.e. is substantially parallel to the path in which charge is being extruded). By way of example but without limitation, in a series of tests clay samples were pierced with a 3/16 inch steel ball attached to a steel end. Piercing forces without vibration averaged about 580 grams. With 300 c.p.s. vibration, the piercing force was reduced to about 20 grams, or less than four percent (4%) of the force required without vibration.

FIGS. 2 and 3 show alternate arrangements in accordance with the invention. In FIG. 2, the hydroacoustic oscillator 28a vibrates the entire mold 20a at a sufficient speed to fluidize the cylindrical cavity 18a while at the same time the mold is vibrated. After fluidization, the charge may be removed from the mold any desired way. The charge is now dried so that it shrinks enough to readily permit its removal from the mold.

In FIG. 3, the hydraulic cylinder 12b is coupled to the oscillator 28b which in turn drives the top part or die 40 of the mold 20b. Unlike the FIG. 2 arrangement, here the charge is vibrated only after the charge is placed in the mold. The bottom portion 41 is fixed. By substantially oscillating the free top die 40, the charge may be fluidized.

While various embodiments of the invention have been described, variations thereof and modifications therein within the spirit of the invention will undoubtedly suggest themselves to those skilled in the art. For example, the invention could be practiced by sufficiently vibrating the extrusion screw of a pug mill to fluidize the charge. Accordingly, the foregoing descriptions should be taken as illustrative and not in any limiting sense.

What is claimed is:

1. Apparatus for forming an article from clay, which apparatus comprises:
    (a) a mold for receiving a charge of the clay and forming said charge into a green body,
    (b) said mold having at least one open end and having grooves in the walls thereof so that said article will be formed with projections thereon,
    (c) a mandrel movable into said open end so as to penetrate said body and to form a hole therein, and
    (d) an acoustic vibration generator for sonically vibrating said mandrel while it penetrates said body to form said hole therein, thereby providing said article ready for drying or firing.

2. The invention as set forth in claim 1 wherein said mandrel has a ball shaped free end which penetrates said billet.

3. The invention as set forth in claim 1 including an acoustic coupling member between said generator and said mandrel for translating the vibrations produced by said generator into reciprocating vibration of said mandrel in a direction axially of said hole.

4. The invention as set forth in claim 1 wherein said mold has another end, a piston at said other end, and means for moving said piston in a direction from said other end to said one end of said mold to provide relative movement of said body and said mandrel so that said mandrel pierces said body to form said hole, thereby forming said hole by extrusion.

5. The invention as set forth in claim 1 wherein said generator is a hydroacoustic generator which provides very powerful sonic vibrations which readily enable said mandrel to penetrate said mold.

References Cited

UNITED STATES PATENTS

| | | | |
|---|---|---|---|
| 817,209 | 4/1906 | Williams | 25—13 |
| 1,150,437 | 8/1915 | Layman | 25—3 |
| 1,526,788 | 2/1925 | Hoffman | 25—3 |
| 1,598,201 | 8/1926 | Koppitz | 25—13X |
| 1,615,800 | 1/1927 | Eaton | 25—3X |
| 1,679,408 | 8/1928 | Davis | 25—3X |
| 2,305,877 | 12/1942 | Klinger | 25—3X |
| 2,480,442 | 8/1949 | Booth | 25—13X |
| 168,743 | 10/1875 | Haws | 25—15 |
| 1,703,871 | 3/1929 | Curtis | 25—29 |
| 2,007,074 | 7/1935 | Clemens | 25—15 |
| 2,772,517 | 12/1956 | Bowes | 164—260X |
| 2,896,266 | 7/1959 | Anthony | 25—29X |
| 3,371,703 | 3/1968 | DeWilde | 164—261X |
| 3,401,026 | 9/1968 | Walker | 164—261X |
| 3,446,265 | 5/1969 | Buck | 164—260X |
| 1,911,228 | 5/1933 | Gathmann | 164—131X |
| 2,897,557 | 8/1959 | Ornitz | 164—49 |
| 3,447,480 | 6/1969 | Bodine | 164—49 |
| 3,447,587 | 6/1969 | Bodine | 164—49 |
| 3,461,942 | 8/1969 | Hoffman | 164—260X |

WAYNE A. MORSE, JR., Primary Examiner

U.S. Cl. X.R.

25—13, 29; 164—49, 261